(12) United States Patent
Morillon

(10) Patent No.: US 6,600,410 B1
(45) Date of Patent: Jul. 29, 2003

(54) SECURITY ARRANGEMENT FOR MOTOR VEHICLE EQUIPPED WITH A PROGRAMMED HANDS-FREE MONITORING SYSTEM

(75) Inventor: Jacques Morillon, Massy (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/785,202

(22) Filed: Feb. 20, 2001

(30) Foreign Application Priority Data

Feb. 18, 2000 (FR) .......................................... 00 02017

(51) Int. Cl.$^7$ ............................................ B60R 25/10
(52) U.S. Cl. ...................... 340/426; 340/428; 340/506; 307/10.5
(58) Field of Search ................................ 340/426, 428, 340/506, 507; 307/10.5

(56) References Cited

U.S. PATENT DOCUMENTS

| 4,643,009 A | | 2/1987 | Sato ............................ 70/252 |
| 5,001,641 A | * | 3/1991 | Makino .................. 364/426.02 |
| 5,519,376 A | * | 5/1996 | Iijima .......................... 340/426 |
| 5,547,208 A | * | 8/1996 | Chappell et al. ............ 180/281 |
| 5,640,057 A | * | 6/1997 | Hirata et al. ................ 307/10.3 |
| 5,673,017 A | * | 9/1997 | Dery et al. .................. 340/426 |
| 5,708,308 A | * | 1/1998 | Katayama et al. ......... 307/10.5 |
| 5,808,543 A | | 9/1998 | Peyre .......................... 340/426 |
| 5,883,444 A | * | 3/1999 | Hirata et al. ................ 307/10.3 |
| 5,973,411 A | * | 10/1999 | Tado et al. ................. 307/10.5 |
| 6,025,653 A | * | 2/2000 | Hayashi et al. ............... 290/33 |
| 6,144,294 A | * | 11/2000 | Watanabe .................... 340/426 |

FOREIGN PATENT DOCUMENTS

| EP | 0499001 | 8/1992 |
| FR | 2454503 | 11/1980 |

* cited by examiner

Primary Examiner—Benjamin C. Lee
Assistant Examiner—Phung T Nguyen
(74) Attorney, Agent, or Firm—Liniak, Berenato & White

(57) ABSTRACT

A security arrangement for motor vehicle equipped with a programmed monitoring system (1) and with at least one specific system (2) to which the monitoring system transmits commands. The arrangement comprises hard-wired logic (4) mounted between a control facility (3) and the specific system, as is the monitoring system. This logic makes it possible to block a command (OV) transmitted by the monitoring system to the specific system, when this command corresponds to that which is obtained in respect of an instruction (C) received by the control facility and when such an instruction has not been received from the control facility by the hard-wired logic. The arrangement is intended to be fitted to a vehicle comprising a programmed monitoring system, such as a "hands-free" monitoring system, and one or more specific systems, for example an electrical anti-theft system or electrical supply monitoring system.

8 Claims, 1 Drawing Sheet

SECURITY ARRANGEMENT FOR MOTOR VEHICLE EQUIPPED WITH A PROGRAMMED HANDS-FREE MONITORING SYSTEM

BACKGROUND OF THE INVENTION

1. Field of the Invention

The invention relates to a security arrangement for motor vehicle equipped with a, main or access, programmed monitoring system, and in particular with a so-called "hands-free" monitoring system.

2. Description of Related Art

In a vehicle equipped with such an access monitoring system, a number of operations which required the use of a key, and, in particular, the opening of the doors of the vehicle, the enabling of the antitheft system and the starting of the engine, are initiated after an exchange of data over the airwaves between a recognition device with which the vehicle is equipped and a designated identifying device carried by the user, when the latter enters the zone of range intended for the initiating of these operations.

These operations are carried out in a general way by electrical control, when a "hands-free" system is employed and it is essential to eliminate any risk of inadvertent initiation of an operation during a phase of functioning where it is not intended. Such inadvertent initiation may, for example, occur because of a failure arising at the level of one of the components of the monitoring system and for example because of a fault attributable to incorrect functioning of a processor. It is thus particularly important to eliminate the risk of a locking of a vehicle antitheft system, while the vehicle is moving, or the risk of a cutoff of the current supplying safety systems, such as the injection management system, the wheel antilock system, or the vehicle balance monitoring system, following a failure occurring at the level of a component of some other system and in particular of the "hands-free" monitoring system.

It is clear that the risk of inadvertent initiation of an operation exists in other working cases and in particular from the moment a fault caused by incorrect functioning of a monitoring system, main or higher level, is liable to affect the functioning of other systems of the vehicle, which depend thereon in one way or another.

Now, one drawback inherent in a programmed monitoring system, for example in a system comprising a microprocessor, is the inability to obtain a sufficiently reliable indication regarding the failure rate of the system on account of its mixed hardware/software construction.

SUMMARY OF THE INVENTION

The invention therefore proposes a security arrangement for motor vehicle equipped with a programmed monitoring system and with at least one specific system to which it transmits commands, which arrangement comprises hard-wired logic mounted between a control facility and the specific system, as is the monitoring system, so as to block the command transmitted by this monitoring system to the specific system, when this command corresponds to that which is obtained in respect of an instruction received by the control facility and when such an instruction has not been received from the control facility by the hard-wired logic.

The decision to choose hard-wired logic in order to reduce the risks is motivated by the fact that the failure rate of such logic is always less than that which it is possible to obtain with the aid of an elaborate programmed system, when a relatively simple operation is to be carried out.

Advantageously, the control facility is made available to a user so as to allow him to transmit specific instructions to the vehicle.

More generally, the control facility is designed to receive instructions originating from various systems for managing specific functions of the vehicle functioning upstream of the security arrangement according to the invention.

In one embodiment of security arrangement for vehicle equipped with an antitheft specific system, the hard-wired logic receives, on the one hand, a turn-off instruction, which is delivered to the monitoring system by means of the control facility, and which brings about the delivery of a locking command by the monitoring system destined for the antitheft system, on the other hand, an indication of the state of functioning of the vehicle which manifests the presence of the supply current distributed within the vehicle from the turn-on phase, until turn-off, the said logic blocking any locking command sent by the monitoring system, if the supply current is distributed and if said logic has not itself received the turn-off instruction.

In one embodiment of a security arrangement for vehicle equipped with a specific system monitoring the supply of current to the vehicle while it is functioning, the hard-wired logic receives a vehicle engine turn-off instruction which is delivered to the monitoring system by means of the control facility, and which brings about the delivery of a supply cutoff command by the monitoring system destined for the specific system. Moreover the hard-wired logic comprises clock means which allow it to deliver a security signal corresponding to a time window of specified duration, on receipt of a turn-off instruction, so as to block at the level of a logic circuit, of AND type, any supply cutoff command transmitted by the monitoring system destined for the specific system, via the logic circuit, when this command is outside the said time window.

The invention also relates to a security arrangement for vehicle comprising a so-called "hands-free" monitoring system and a vehicle comprising at least one security arrangement defined hereinabove.

The invention, its characteristics and its advantages are spelled out in the description which follows in conjunction with the figures mentioned hereinbelow.

DETAILED DESCRIPTION OF THE PREFERRED EMBODIMENTS

Figure 1:
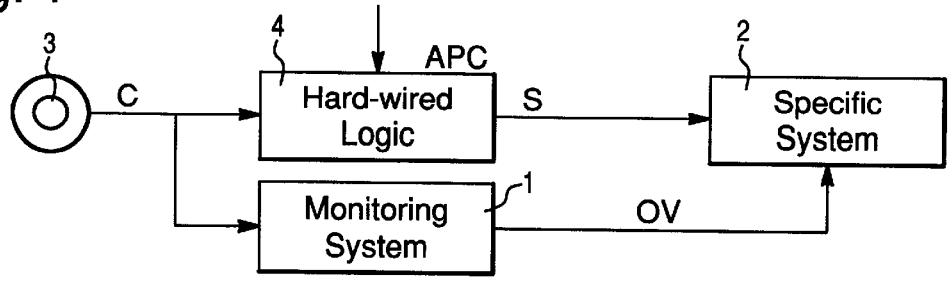
FIG. 1 depicts a basic diagram of a security arrangement for motor vehicle equipped with a monitoring system and with a specific system to which the monitoring system transmits commands.

The security arrangement depicted in FIG. 1 is intended to be mounted in a motor vehicle equipped with a programmed monitoring system 1. This programmed monitoring system 1 is for example a main system, which has a hierarchical level which is higher than the other systems which the vehicle may include. It can also be an access authorization system and in particular a so-called "hands-free" system by way of which operations are carried out at vehicle level, when a user carrying an appropriate identifying device is within the zone of range intended for his operations, at vehicle level.

It is also assumed that the vehicle is equipped with at least one specific system 2 and that this specific system receives commands originating from the monitoring system 1. An electrically controlled antitheft system, a system for monitoring the current supply, an injection management system, a wheel antilock system, and/or a vehicle balance monitoring system constitute examples of specific systems of this kind.

The security arrangement, according to the invention, is designed to act in the case where the programmed monitoring system 1 transmits a command to a specific system 2 and where this command corresponds to that which is obtained in respect of an instruction transmitted by a user by way of a control facility 3 which is made available to this user in the vehicle.

There is in fact a risk that, following defective functioning at the monitoring system level, a command may be sent by this system, to a specific system, without there having been any instruction from the user. This could lead for example to the sending of a locking command to the antitheft system, while the vehicle is turned on.

According to the invention, the security arrangement comprises hard-wired logic 4 which is mounted between the control facility 3 and the specific system 2, as likewise is the monitoring system, so that the instruction transmitted by a user by means of the control facility 3 is simultaneously received by the hard-wired logic 4 and by the monitoring system.

The linking up of the hard-wired logic with the specific system, the recipient of a command transmitted by the monitoring system, is designed to allow this logic to act so as to prevent the execution, by the specific system, of a command, corresponding to a direct instruction from a user to a system, if it has not itself received the instruction.

Figure 2:
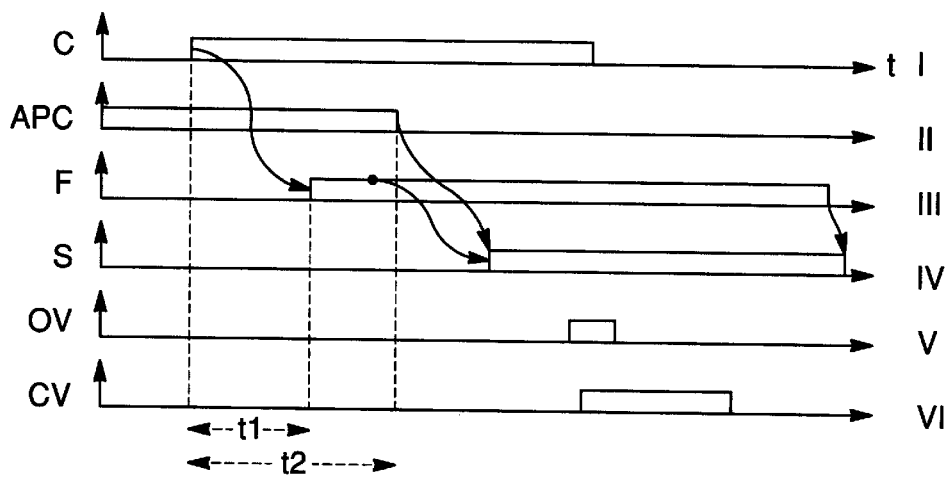
FIG. 2 depicts an operating chart relating to the security arrangement depicted in FIG. 1.

The chart depicted in FIG. 2 relates to one embodiment envisaged in respect of a motor vehicle equipped with a programmed monitoring system, of the microprocessor kind, and with a specific system 2, of the electrically controlled antitheft system type. The control facility 3 is here assumed to be a button controlling the turning on and turning off of the engine of the vehicle.

The turn-on phase involves supplying electrical energy to a number of electrical equipment circuits of the vehicle which are not supplied, when the vehicle is turned off completely. This so-called after-contact supply or APC, is here assumed to be switched on and switched off by way of the turn-on and turn-off button. An indication of the presence of the APC supply current, which is delivered, is transmitted to an APC input of the hard-wired logic, as long as this current is flowing and hence in particular, when the vehicle is switched on.

The presence of this current is represented by a binary APC signal which is assumed to be of level 1 on line II of the chart of FIG. 2. If the vehicle is operational and if the user wishes to turn it off completely, he must press the switch-on and switch-off button which constitutes the control facility 3. This action is manifested by an instruction C represented by a binary signal whose duration is shown diagrammatically in line I of FIG. 2. The hard-wired logic comprises clock means embodied according to techniques known to the person skilled in the art and not represented here, which allow same to create an authorization time window represented by a signal F whose duration is shown diagrammatically by a binary signal of level 1, on line III of FIG. 2. This signal commences a specified time t1 after the commencement of the instruction signal C.

A time t2 later, after the commencement of this instruction signal C, the APC supply current is cut off, as shown diagrammatically in line II, t2 being chosen to be greater than t1. A security signal S is then sent by the hard-wired logic 4 to the antitheft system, so as to authorize execution of the locking command OV which the monitoring system 1 is responsible for delivering. It is assumed here that the antitheft system and the monitoring system are supplied with energy directly from the battery of the vehicle.

The locking command OV delivered by the monitoring system is represented in the form of a pulse in line V of FIG. 2, it is envisaged that it will be taken into account by the locking system only if the security signal S is also present. This is achieved, for example, by applying both signals S and OV to a logic circuit requiring the simultaneous presence of both these signals so as to produce the signal CV which controls locking and which is represented in the form of a binary pulse of level 1, in line VI of FIG. 2.

The possible appearance of a command OV produced by the monitoring system, without there having been any instruction from the user, cannot be taken into account by the locking system, since no window F has been created and since the supply current has not been cut off. This leads to the security signal S not being produced.

Figure 3:
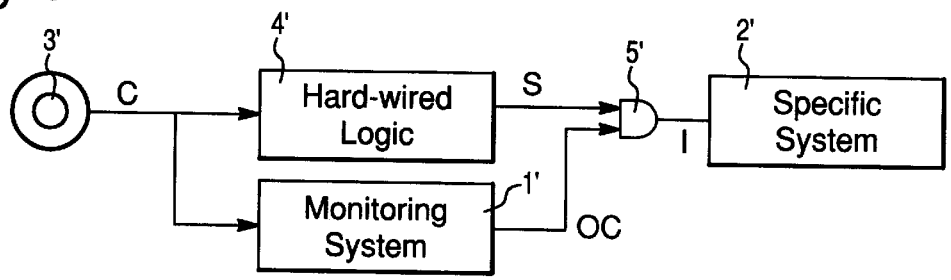
FIG. 3 depicts a variant of security arrangement, as depicted in FIG. 1.

A variant of the security arrangement, according to the invention, is depicted in FIG. 3. It is intended for a motor vehicle equipped with a monitoring system 1' and with a specific system 2' responsible for monitoring the electrical current supply, the so-called after-contact or APC supply, to the electrical equipment circuits of the vehicle which are not supplied, when the vehicle is turned off completely. The control facility 3' for switching this supply on or off is here the button controlling the turning on and turning off of the engine of the vehicle.

The security arrangement is envisaged here for the case where the monitoring system transmits a supply cutoff command which corresponds to that which is obtained in respect of a cutoff instruction transmitted by a user by way of the control facility 3'.

This is again aimed at averting the risk of the sending of a cutoff command by the monitoring system, although there has been no instruction from the user, for example, when the vehicle is turned on and when it is necessary for the equipment circuits of the vehicle to remain supplied.

In the exemplary embodiment proposed, the security arrangement comprises hard-wired logic 4' again mounted between the control facility 3' and the specific system 2' monitoring the supply, as likewise is the monitoring system 1'. The instruction transmitted by a user by means of the control facility 3' is therefore received simultaneously by the hard-wired logic 4' and by the monitoring system 1'. A logic circuit 5', of AND type, is mounted between a security signal S output of the hard-wired logic 4', an OC command output of the monitoring system 1' and a cutoff instruction signal I input of the specific system 2'.

Figure 4:
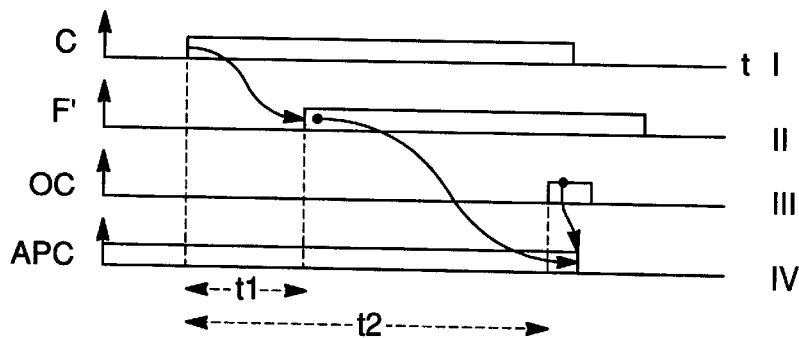
FIG. 4 depicts an operating chart relating to the variant of security arrangement depicted in FIG. 3.

As shown diagrammatically in the chart depicted in FIG. 4, it is envisaged that cutoff of the APC supply be controlled by an action of a user on the control facility 3', thereby triggering the transmission of an instruction signal C represented by a binary signal of level 1 on line I of FIG. 4. This signal is transmitted simultaneously to the hard-wired logic 4' and to the monitoring system 1' by the control facility 3'. The hard-wired logic 4' likewise comprises clock means which allow it to create an authorization window which is manifested by a signal F', the duration of which is illustrated in line II of FIG. 4, a specified time t1 after the commencement of the instruction signal C.

The monitoring system 1' produces a cutoff command OC, after taking into account the instruction C which has been delivered to it by the control facility 3'. Owing to the time required for the processing of this instruction and the value chosen for t1, it is envisaged that this command be sent in the course of the window represented by the signal F', illustrated in line III of FIG. 4. The simultaneous application of the signal F' and of the cutoff command OC to the inputs of the logic circuit 5' is manifested by an instruction signal I which acts on the specific system 2' monitoring the current supply so as to trigger cutoff of the APC supply, as illustrated by the signal AOC representative of the state of this supply on line IV of FIG. 4.

The possible appearance of an OC command produced by the monitoring system, without there having been any instruction from the user cannot be taken into account by the system for monitoring the APC supply, since no window F' has been created. The transmission of the command OC is blocked by the logic circuit 5'.

All the embodiments of the invention have been described within the context of a control facility (3) made available to a user so as to allow him to transmit instructions to the vehicle.

More generally the control facility (3) can receive instructions originating from various systems for managing specific functions of the vehicle functioning upstream of the security arrangement according to the invention.

What is claimed is:

1. A security arrangement for motor vehicle equipped with a control facility (3), with at least one specific system (2) and with a programmed monitoring system (1) which is hard-wired between said control facility and said specific system in order that said programmed monitoring system (1) can receive an instruction (C) from said control facility and transmit thereupon a command (OV) to the specific system, wherein said security arrangement comprises hard-wired logic (4) mounted between said control facility and said specific system in order to be able to receive said instruction (C), said hard-wired logic blocking said command sent by said programmed monitoring system to said specific system when said hard-wired logic has not received said instruction (C).

2. The arrangement as claimed in claim 1, wherein the control facility is made available to a user so as to allow him to transmit instructions to the vehicle.

3. The arrangement as claimed in claim 1, wherein the instructions received by the control facility originate from systems for managing specific functions of the vehicle functioning upstream of the security arrangement.

4. The arrangement as claimed in claim 1, for vehicle equipped with an antitheft specific system (2), where the hard-wired logic (4) receives, on the one hand, a turn-off instruction (C), which is delivered to the monitoring system (1) by means of the control facility (3), and which brings about the delivery of a locking command (OV) by the monitoring system destined for the antitheft system, on the other hand, an indication of the state of functioning of the vehicle which manifests the presence of the supply current (APC) distributed within the vehicle from the turn-on phase, until turn-off, the said logic blocking any locking command sent by the monitoring system, if the supply current is distributed and if said logic has not itself received the turn-off instruction.

5. The arrangement as claimed in claim 1, for vehicle equipped with a specific system (2') monitoring the supply of current to the vehicle while the vehicle is functioning, where the hard-wired logic (4') receives a vehicle engine turn-off instruction (C) which is delivered to the monitoring system by means of the control facility (3'), and which brings about the delivery of a supply cutoff command (OC) by the monitoring system destined for the specific system, and where the hard-wired logic comprises clock means which allow it to deliver a security signal (S) corresponding to a time window of specified duration, on receipt of a turn-off instruction, so as to block at the level of a logic circuit (5') any supply cutoff command (OC) transmitted by the monitoring system destined for the specific system, via the logic circuit, when this command is outside the said time window.

6. The arrangement as claimed in claim 4, in which the hard-wired logic (4) combines the indication which manifests the absence of supply current (APC) following a vehicle engine turn-off instruction (C) produced by means of the control facility (3), and a signal, corresponding to an authorization time window (F), triggered by the receipt of the turn-off instruction, so as to produce a security signal (S) which is transmitted to the antitheft system and in the absence of which any locking command (OV) transmitted by the monitoring system is blocked.

7. The arrangement as claimed in claim 1, in which the programmed monitoring system is a so-called "hands-free" monitoring system.

8. A motor vehicle equipped with a programmed monitoring system and with at least one specific system to which the monitoring system transmits commands, which vehicle comprises a security arrangement, according to claim 1.

* * * * *